US010709282B2

United States Patent
(12) United States Patent
Lee

(10) Patent No.: US 10,709,282 B2
(45) Date of Patent: Jul. 14, 2020

(54) VACUUM LOW-TEMPERATURE COOKER

(71) Applicant: INTROPACK. CO., LTD., Gyeonggi-do (KR)

(72) Inventor: Kyul-Joo Lee, Chungcheongnam-do (KR)

(73) Assignee: INTROPACK. CO., LTD., Gyeonggi-do (KR)

(*) Notice: Subject to any disclaimer, the term of this patent is extended or adjusted under 35 U.S.C. 154(b) by 379 days.

(21) Appl. No.: 15/573,341

(22) PCT Filed: May 10, 2016

(86) PCT No.: PCT/KR2016/004895

§ 371 (c)(1),
(2) Date: Nov. 10, 2017

(87) PCT Pub. No.: WO2016/182323

PCT Pub. Date: Nov. 17, 2016

(65) Prior Publication Data

US 2018/0103789 A1 Apr. 19, 2018

(30) Foreign Application Priority Data

May 11, 2015 (KR) ........................ 10-2015-0065636
Apr. 12, 2016 (KR) ........................ 10-2016-0044756
Apr. 12, 2016 (KR) ........................ 10-2016-0044763

(51) Int. Cl.
*A47J 27/10* (2006.01)
*B65B 31/02* (2006.01)
(Continued)

(52) U.S. Cl.
CPC ................. *A47J 27/10* (2013.01); *A23L 5/17* (2016.08); *A47J 36/24* (2013.01); *A47J 36/2405* (2013.01);
(Continued)

(58) Field of Classification Search
CPC ............ A47J 27/00; A47J 27/10; B65B 65/00
See application file for complete search history.

(56) References Cited

U.S. PATENT DOCUMENTS

2006/0053748 A1 3/2006 Ahn et al.
2013/0220143 A1 8/2013 Fetterman et al.
(Continued)

FOREIGN PATENT DOCUMENTS

EP 3095359 11/2016
JP 05-115360 5/1993
(Continued)

OTHER PUBLICATIONS

International Search Report for PCT/KR2016/004895, dated Jul. 26, 2016, 4 pages.

*Primary Examiner* — Jason L Vaughan
*Assistant Examiner* — Amanda Kreiling
(74) *Attorney, Agent, or Firm* — Dority & Manning, P.A.

(57) ABSTRACT

A vacuum low-temperature cooker includes a main body having a heating unit immersed in fluid accommodated in an accommodation tub and heating the fluid, a vacuum packaging unit connected to the main body and vacuum-sealing a packaging film, and a control unit installed in the main body or the vacuum packaging unit, and electrically connected to the heating unit and the vacuum packaging unit so as to control the heating unit and the vacuum packaging unit.

17 Claims, 14 Drawing Sheets

100 110 120 111 190 111b 111a 310 320 300 330 PCB 121 200 VP 130 T 414 510 S P 480 400

300 310 320 100 110 120 190 121 111 11 111b 400 111a 1 10

(51) Int. Cl.

| | |
|---|---|
| ***B65B 51/10*** | (2006.01) |
| ***B65B 57/00*** | (2006.01) |
| ***F04B 37/14*** | (2006.01) |
| ***A47J 36/24*** | (2006.01) |
| ***B65B 65/00*** | (2006.01) |
| ***A23L 5/10*** | (2016.01) |

(52) U.S. Cl.

CPC .............. *B65B 31/02* (2013.01); *B65B 51/10* (2013.01); *B65B 57/00* (2013.01); *B65B 65/00* (2013.01); *F04B 37/14* (2013.01)

(56) References Cited

U.S. PATENT DOCUMENTS

| | | | | |
|---|---|---|---|---|
| 2013/0240500 | A1 * | 9/2013 | Alipour | A47J 27/004 219/438 |
| 2015/0040516 | A1 * | 2/2015 | Torre | B65B 25/22 53/167 |
| 2015/0082996 | A1 | 3/2015 | Wu | |
| 2015/0335192 | A1 * | 11/2015 | Plazarte | B65B 25/22 99/332 |

FOREIGN PATENT DOCUMENTS

| | | | |
|---|---|---|---|
| JP | 2002-159397 | 6/2002 | |
| JP | 2005-247383 | 9/2005 | |
| KR | 20050041453 | 5/2005 | |
| KR | 10-0546042 | 1/2006 | |
| WO | WO2014/019018 | 2/2014 | |
| WO | WO2015/056284 | 4/2015 | |
| WO | WO-2015056284 A1 * | 4/2015 | A47J 27/10 |

* cited by examiner

[FIG. 1]
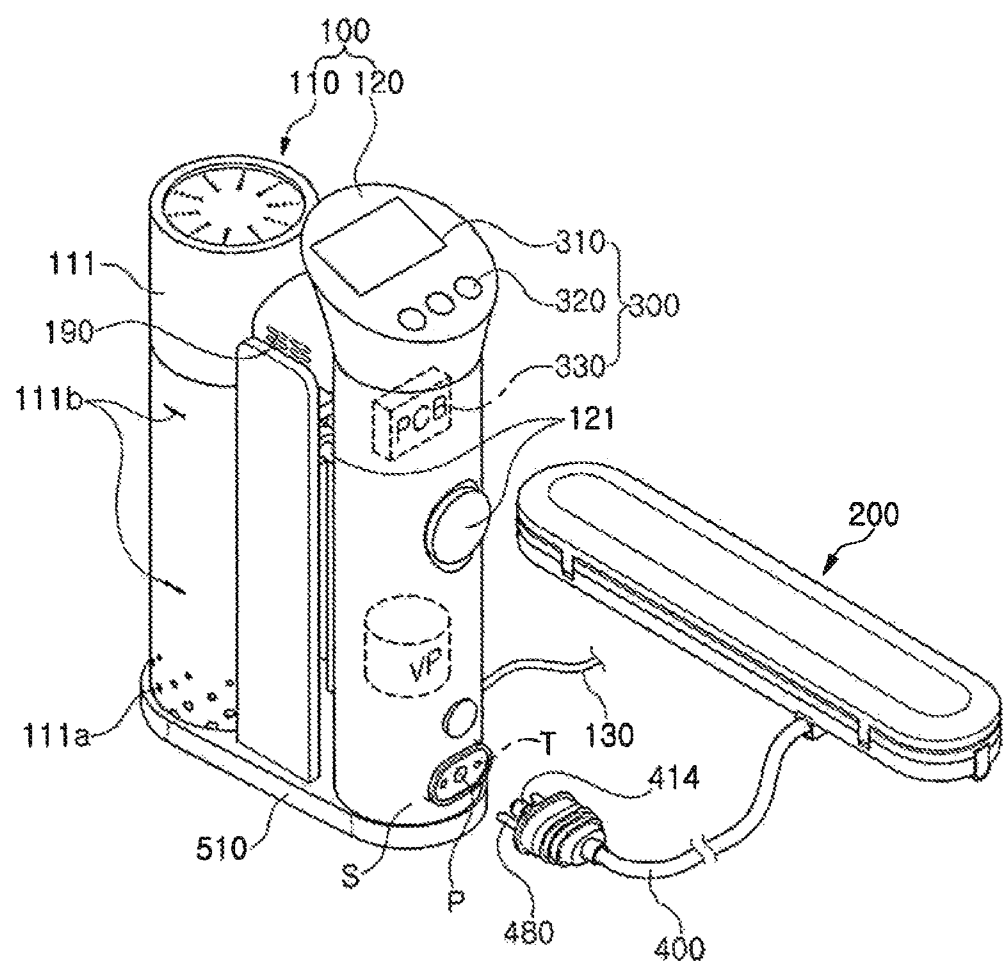

[FIG. 2]
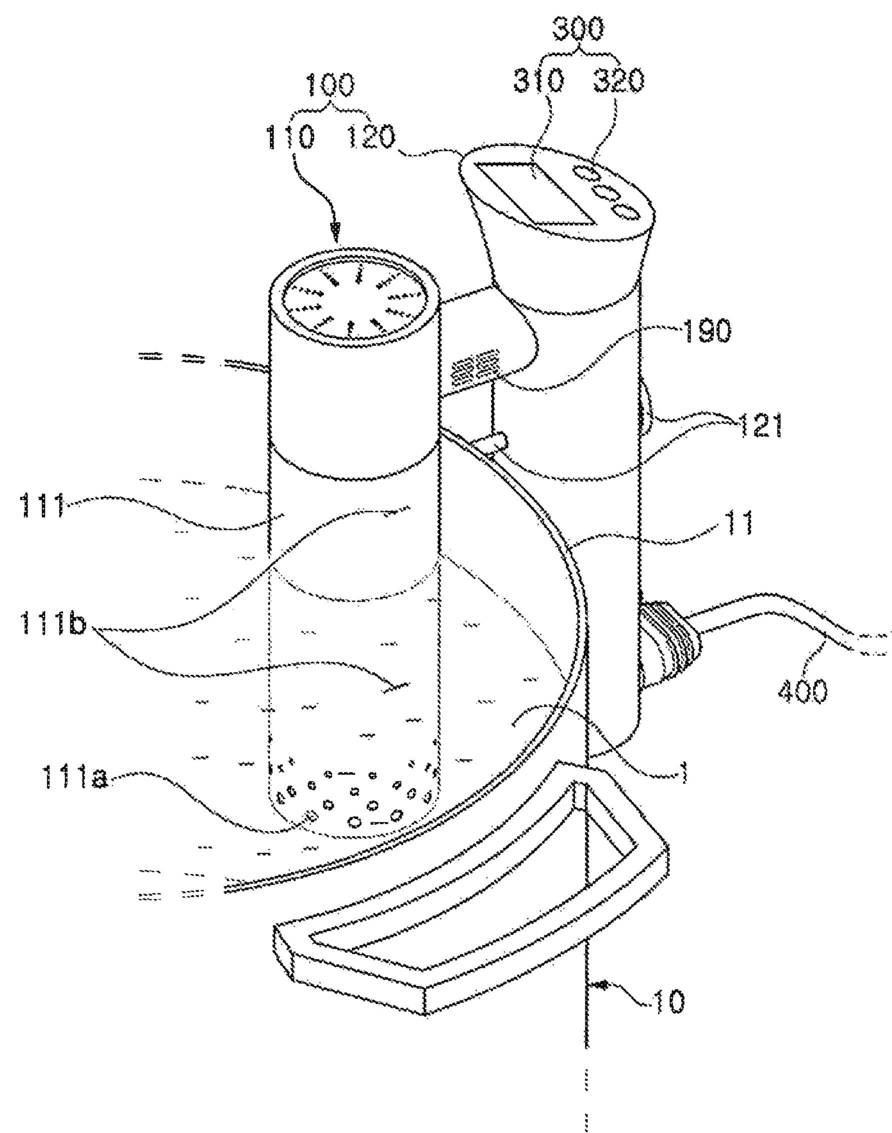

[FIG. 3]
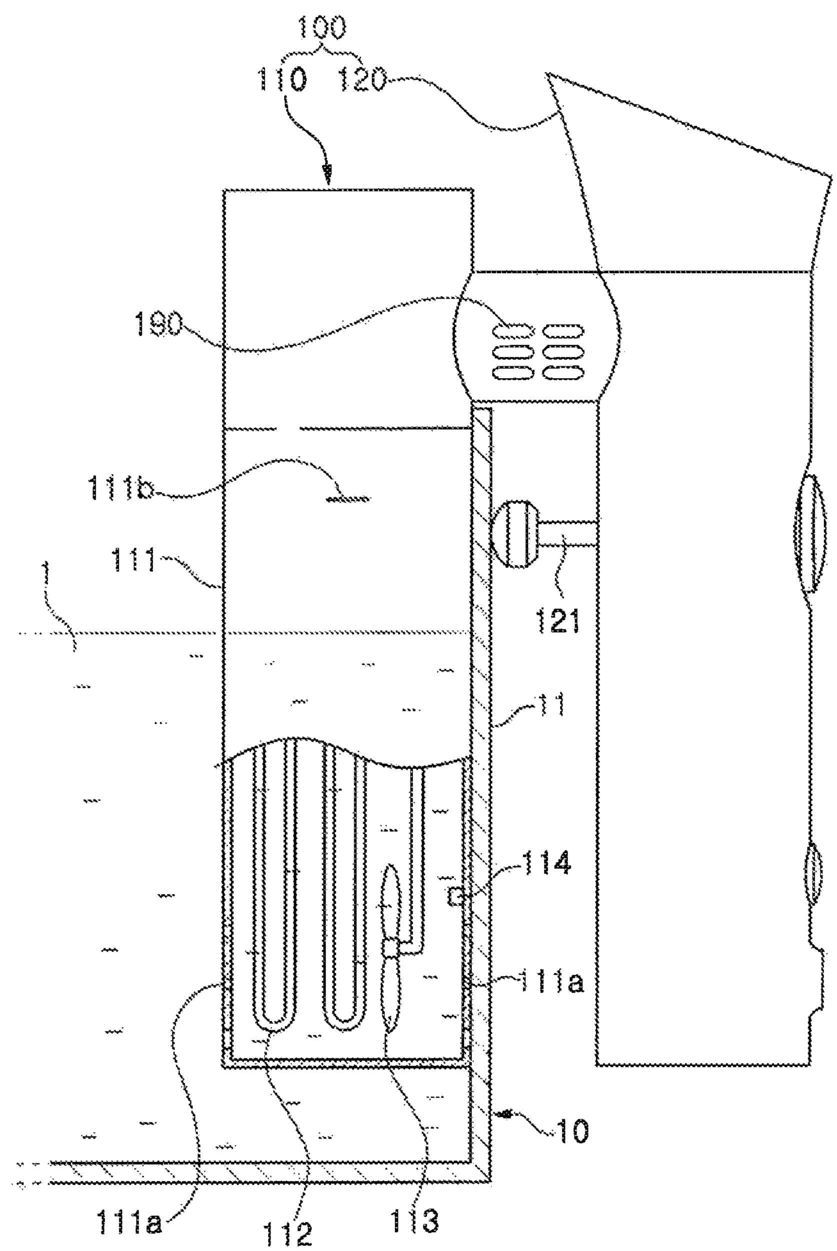

[FIG. 4]
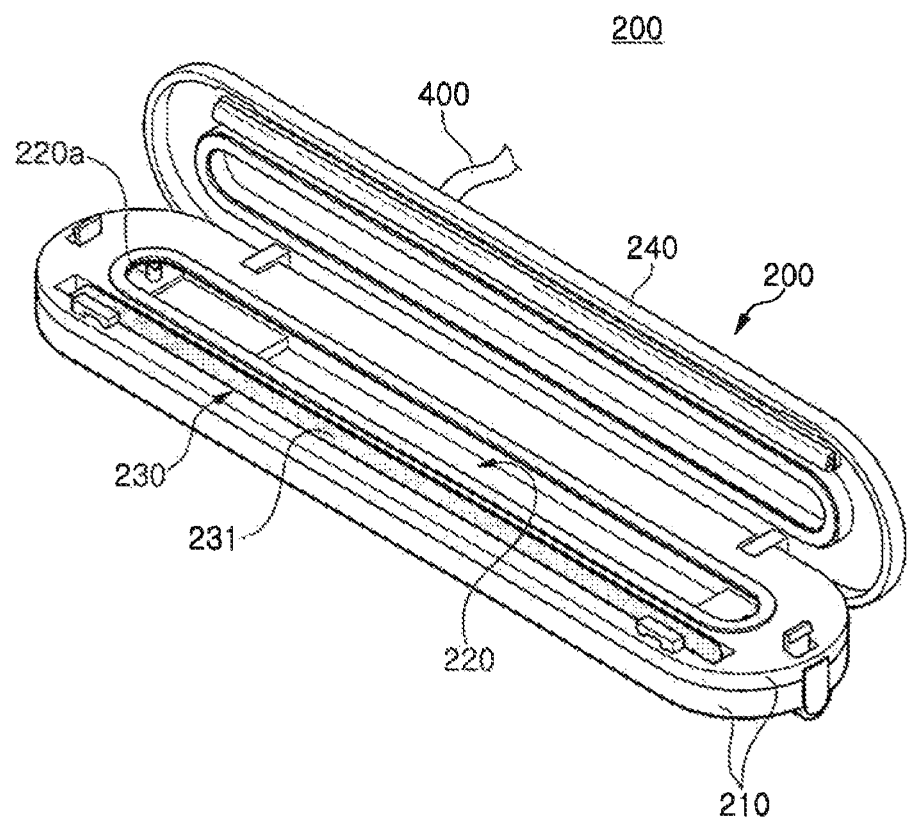

[FIG. 5]
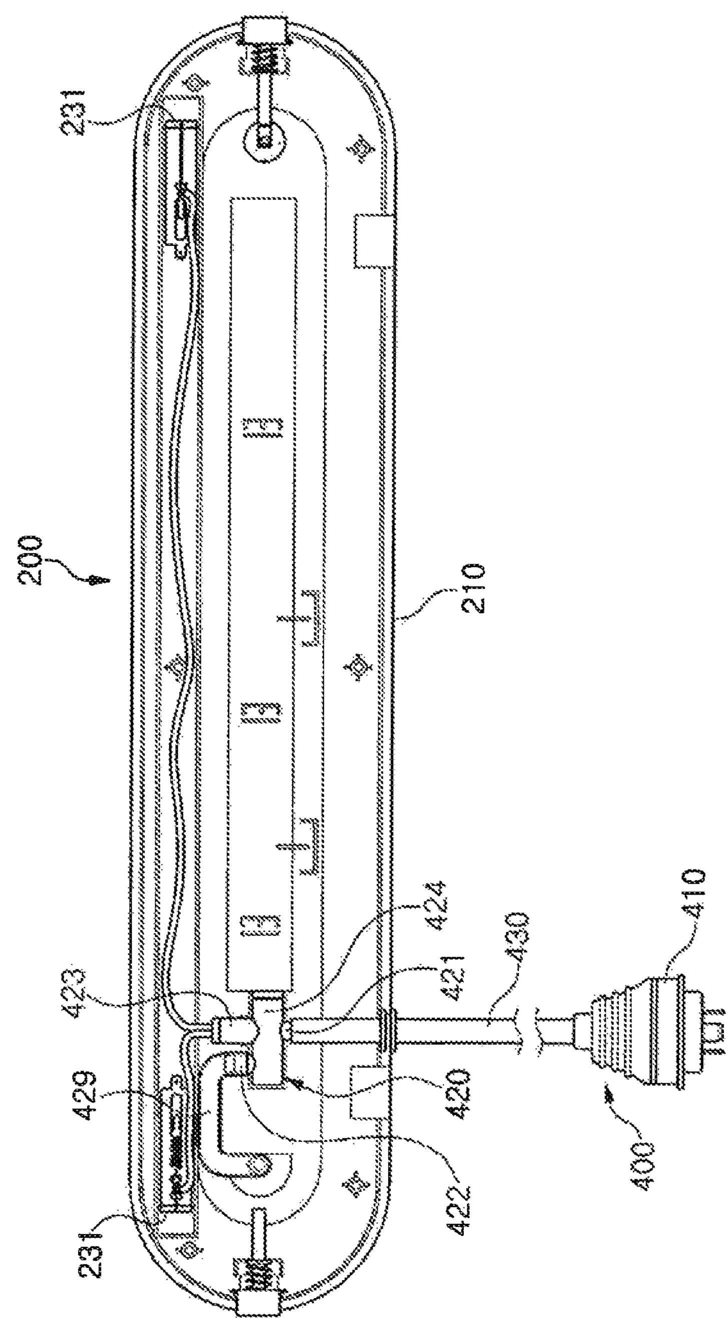

[FIG. 6]
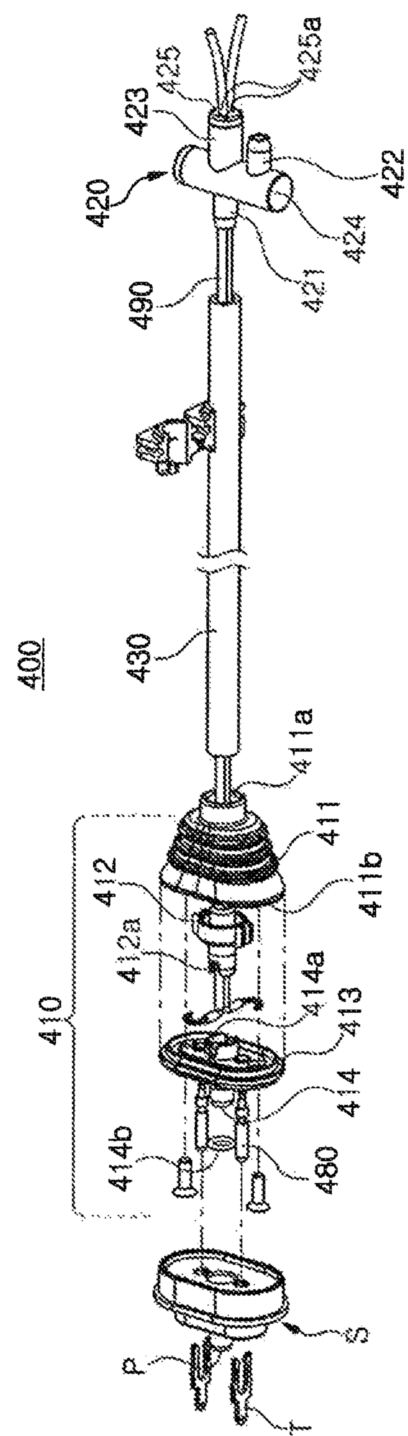

[FIG. 7]
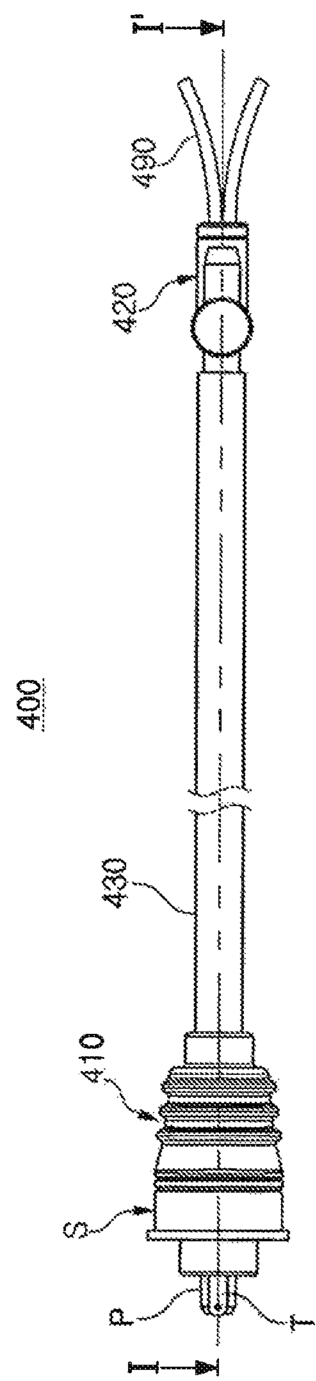

[FIG. 8]
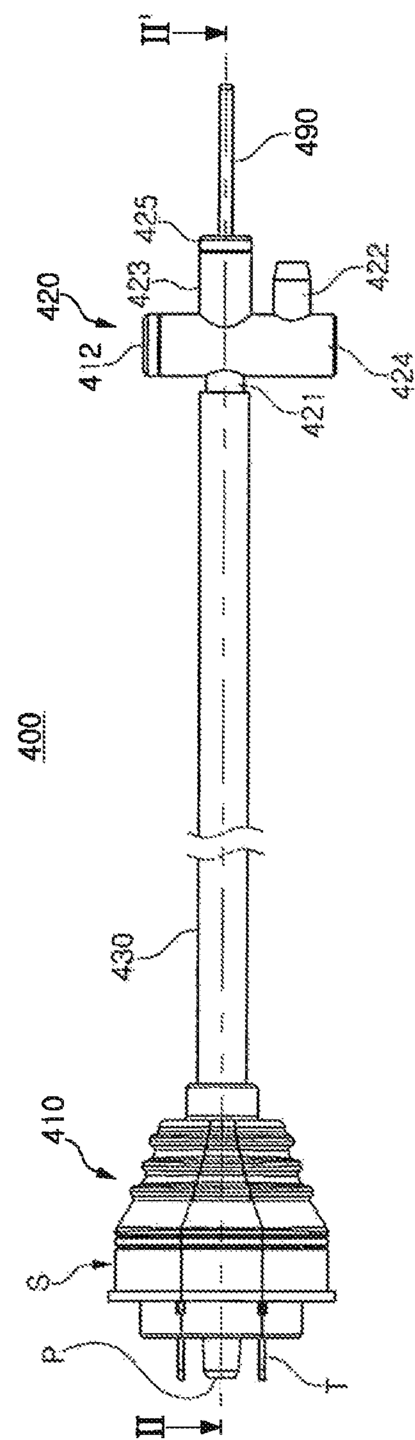

[FIG. 9]
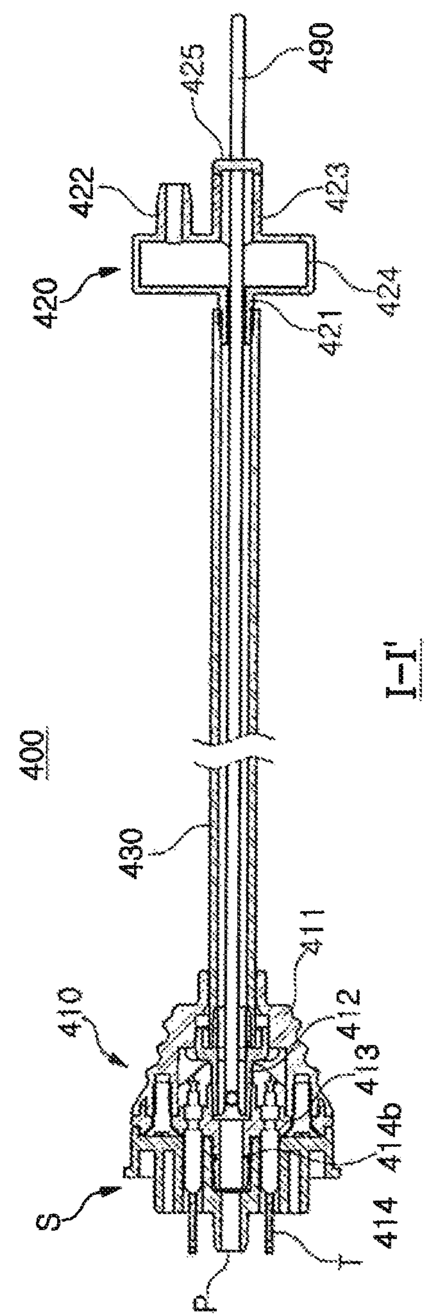

[FIG. 10]
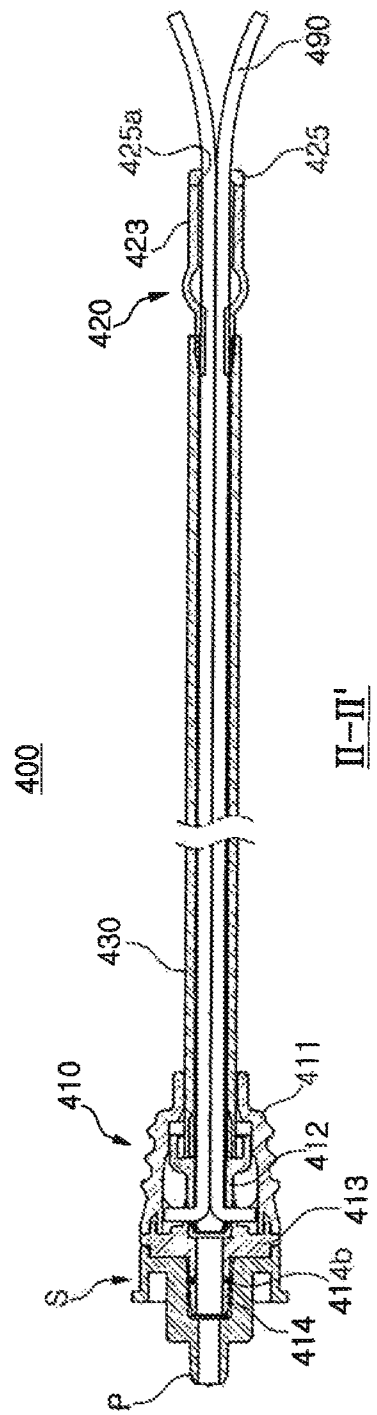

[FIG. 11]
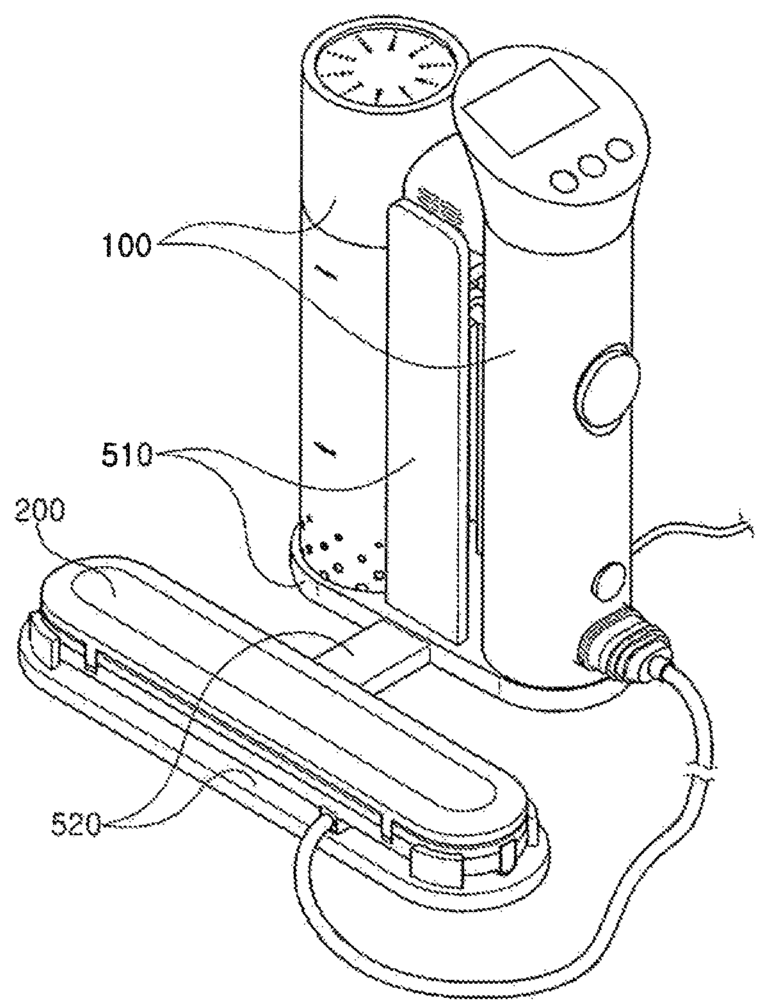

[FIG. 12]
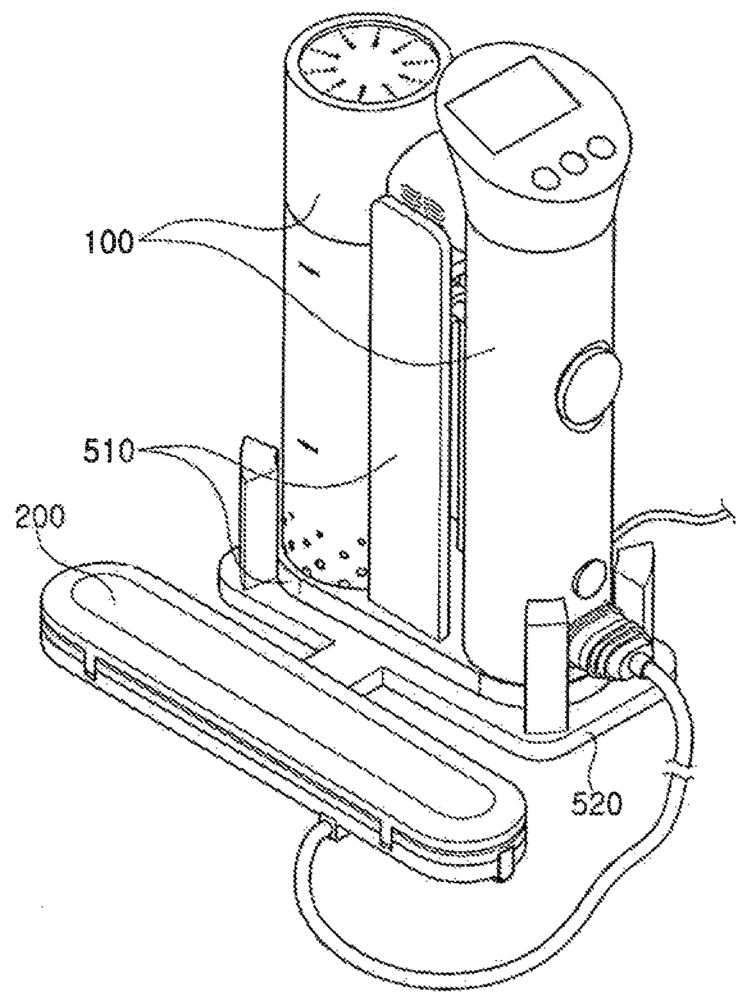

[FIG. 13]
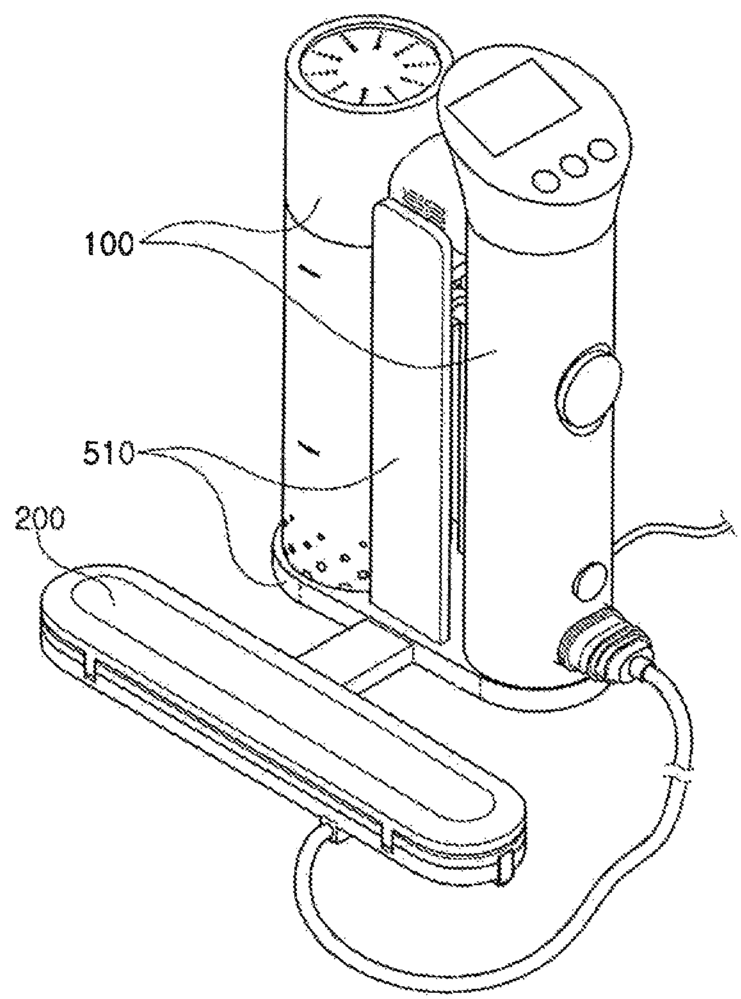

[FIG. 14]
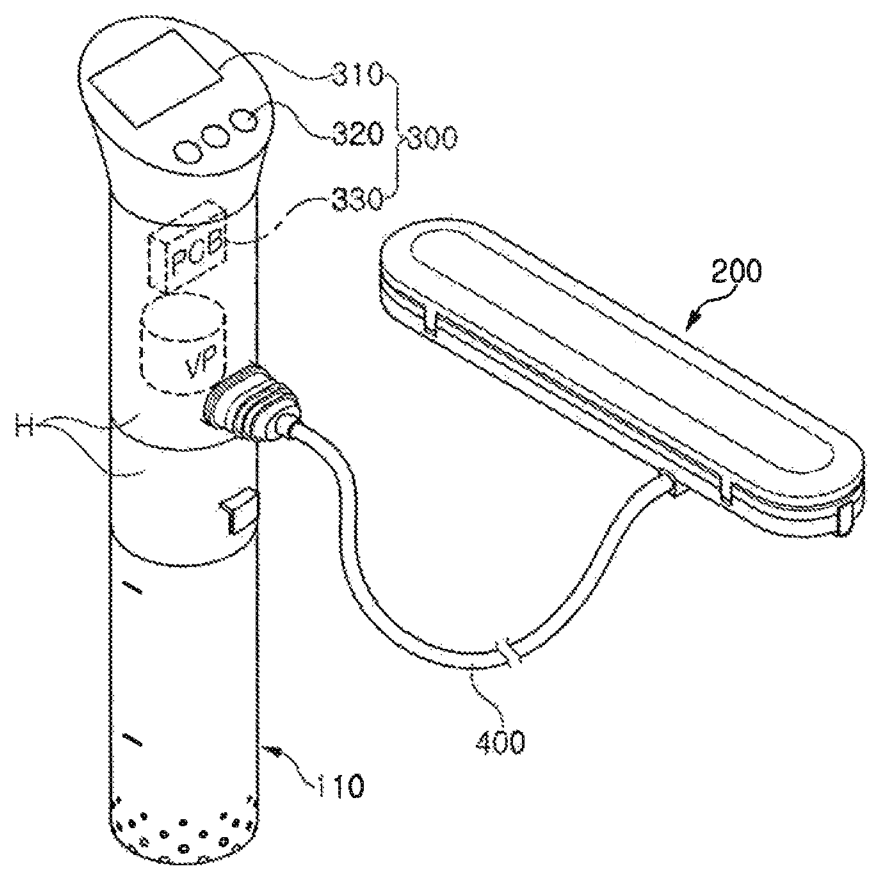

VACUUM LOW-TEMPERATURE COOKER

CROSS REFERENCE TO RELATED APPLICATIONS

This application is the U.S. National Stage entry of International Application Number PCT/KR2016/004895 filed under the Patent Cooperation Treaty having a filing date of May 10, 2016, which claims priority to Korean Patent Application Serial Number 10-2015-0065636 having a filing date of May 11, 2015, Korean Patent Application Serial Number 10-2016-0044756 having a filing date of Apr. 12, 2016, and Korean Patent Application Serial Number 10-2016-0044763 having a filing date of Apr. 12, 2016.

TECHNICAL FIELD

The present disclosure relates to a vacuum low-temperature cooker, and more particularly, to a vacuum low-temperature cooker for vacuum-packaging and heating food.

BACKGROUND ART

Sous Vide is a cooking method using low-temperature, and is a method partially developed in 1971 at Cuisine Solutions (a research institute involved in the development of the Sous Vide method for slow cooking food).

The Sous Vide cooking method, allowing food to retain nutrients, texture, and moisture close to those of a precooked state, when cooked, is a method in which food contained in a vacuum packaging film is sealed under vacuum, and is then immersed in warm water to be heated over a long period of time at a relatively low temperature. In this case, while the temperature of water is maintained at a constant level, food is heated over a long period of time.

A temperature of water heating the food varies, depending on a type of food to be cooked, but the temperature thereof is usually maintained at about 75° C. Since food is immersed in water of which a temperature is uniformly raised and maintained, an external surface and an interior of the food are uniformly heated, and the moisture content of the food can be maintained.

However, in a case in which food is not reliably sealed and vacuum-packaged, a texture of food may be changed, nutrients may be destroyed, and a cooking state of food may be deteriorated. Thus, the step of vacuum-packaging food is a significantly important operation in the Sous Vide cooking method.

Thus, after food is vacuum-packaged, the food should be immersed in water at a temperature uniformly raised and maintained. Thus, a user may perform the vacuum packaging of food and the heating of water.

DISCLOSURE

Technical Problem

An aspect of the present disclosure may provide a vacuum low-temperature cooker, provided to allow vacuum packaging and water heating to be performed with a single device, and capable of smoothly and conveniently performing vacuum low-temperature cooking and reducing manufacturing costs to lower product costs.

Technical Solution

According to an aspect of the present disclosure, a vacuum low-temperature cooker includes: a main body having a heating unit immersed in fluid accommodated in an accommodation tub and heating the fluid; a vacuum packaging unit connected to the main body and vacuum-sealing a packaging film; and a control unit installed in the main body or the vacuum packaging unit, and electrically connected to the heating unit and the vacuum packaging unit so as to control the heating unit and the vacuum packaging unit.

A vacuum pump, providing air suction power to the vacuum packaging unit, and the control unit may be installed in the main body, and the vacuum packaging unit and the main body may be connected by a connection cable so as to be in air and electrical communication with each other.

According to another aspect of the present disclosure, a vacuum low-temperature cooker includes: a vacuum packaging unit having a chamber portion sucking air from a packaging film and a sealing unit heat-sealing the packaging film; a main body having a heating unit immersed in fluid accommodated in an accommodation tub and heating the fluid, a stirring member stirring the fluid, and a vacuum pump providing air suction power in the chamber portion; and a control unit installed in the main body, and controlling the chamber portion, the sealing unit, the heating unit, the stirring member, and the vacuum pump, wherein the vacuum packaging unit and the main body are connected by a connection cable so as to be in air and electrical communication with each other.

The connection cable may include: an air line, connecting a chamber portion of the vacuum packaging unit, in which air is sucked, to the vacuum pump, to allow air to flow; and an electric line electrically connecting a sealing unit of the vacuum packaging unit, heated, to the control unit.

The electric line may be provided with at least a portion disposed in the air line.

The air line may includes: an air plug formed to be connected to an air end of the vacuum pump; an air connector connected to the chamber portion of the vacuum packaging unit; and an air hose connecting the air plug to the air connector, and the electric line may include: an electric plug pin mounted on the air plug, and formed to be connected to an electricity end of the control unit; and an electric wire, passing through while being disposed in the air connector and the air hose, one end of which is connected to a sealing unit of the vacuum packaging unit and the other end is connected to the electric plug pin.

The air plug may include: a plug housing in which the air hose is inserted into an interior through a connection hole of one end, and an opening is formed in the other end; an inner tube, disposed in the plug housing, one end of which is connected to the air hose and a side portion of the other end is provided with a first half-hole formed therein; and a housing cover mounted on the opening to cover the opening of the plug housing, the electric plug pin is mounted to pass through the housing cover to allow one end to be disposed inwardly of the plug housing and to allow the other end to be disposed outwardly of the plug housing, the housing cover may have an air tube passing through and extended outwardly of the plug housing while being connected to the inner tube, and the air tube may be provided with a second half-hole combined with the first half-hole and forming an outlet of the electric wire as the other end of the inner tube may be inserted into and connected to an end of the air tube inwardly of the plug housing, so the electric wire may be connected to one end of the electric plug pin through the outlet.

The air connector may include: a first branch tube connected to the air hose; a second branch tube connected to the chamber portion by a link tube; a third branch tube provided with the electric wire disposed therein and passing therethrough; and a hub tube connecting the first branch tube, the second branch tube, and the third branch tube, and the electric wire may pass from the air hose through the hub tube and the third branch tube to be extended and disposed.

The third branch tube may be provided with an end with a stopper having a line hole provided with only the electric wire disposed therein and passing therethrough, so as not to allow air to pass therethrough and to only allow the electric wire to pass therethrough.

The electric line may be provided with at least a portion attached to an external surface of the air line, or disposed in an outer cover of the air line.

The heating unit may include: an inner housing immersed in the fluid in the accommodation tub, and having a through hole formed therein to allow the fluid to pass therethrough; a heater embedded in the inner housing and heating the fluid; a stirring member embedded in the inner housing, and allowing the fluid to flow so as to allow the fluid to pass the inner housing through the through hole; and a sensor mounted on the inner housing, and measuring a temperature of the fluid.

The vacuum packaging unit may include: a base member connected to the main body; a chamber portion mounted on the base member, and provided with an air suction hole sucking air from the packaging film formed therein; a sealing unit mounted on the base member, and sealing the packaging film; and a cover member mounted on the base member, and configured to cover the chamber portion and the sealing unit with the packaging film interposed between the cover member, and the chamber portion and the sealing unit.

The control unit may include: an input unit into which a control command is input so as to control the heating unit and the vacuum packaging unit; a display unit displaying an input display of the input unit and a state display of the heating unit and the vacuum packaging unit; and a control processing unit processing the control command input through the input unit.

The main body may include: a pressure sensor electrically connected to the vacuum pump and the control unit, and measuring negative pressure of the vacuum pump to allow the control unit to control an operation of the vacuum pump.

The main body may have an inner housing and an outer housing, the inner housing may be provided with the heating unit mounted thereon and may be disposed inwardly of the accommodation tub in a plan view, the outer housing may be connected to the inner housing and may be disposed outwardly of the accommodation tub in a plan view, and the outer housing may be provided with the vacuum pump and the control unit mounted thereon.

The inner housing and the outer housing may be disposed to be parallel in a vertical direction and may be disposed to be connected to each other in a "∩" shape in which a stop groove may be formed in a lower portion, so a side wall of the accommodation tub may be inserted into the stop groove to allow the main body to be caught in the accommodation tub.

The outer housing may be provided with a clamp, pressing the side wall of the accommodation tub, so as to allow a position of the main body to be fixed to the accommodation tub.

The heating unit, the vacuum pump, and the control unit may be mounted on a single housing disposed inwardly of the accommodation tub in a plan view.

The vacuum low-temperature cooker may further include: a stand on which the main body is mounted.

The stand or the vacuum packaging unit may be provided with a support bracket portion configured to allow the stand and the vacuum packaging unit to be removably attachable to each other.

The stand or the support bracket portion may be provided with the connection cable embedded therein, and the main body and the vacuum packaging unit may be in air and electrical communication with each other by the connection cable, when fastened to a terminal of the connection cable, exposed in the stand or the support bracket portion.

The stand may be integrally formed with the vacuum packaging unit.

Advantageous Effects

According to an exemplary embodiment in the present disclosure, a vacuum low-temperature cooker may have a structure in which a main body having a heating unit and a vacuum packaging unit are combined in one. In further detail, all of a main body having a heating unit heating fluid for low-temperature cooking and a vacuum packaging unit vacuum-packaging food are configured to be controlled in a single control unit. Thus, vacuum low temperature cooking may be smoothly and conveniently performed, and manufacturing costs may be reduced to lower product costs.

DESCRIPTION OF DRAWINGS

FIG. 1 is a perspective view illustrating a low-temperature cooker according to an exemplary embodiment vacuum.

FIG. 2 is a perspective view illustrating a main body fixed to an accommodation tub in the vacuum low-temperature cooker of FIG. 1.

FIG. 3 is a front view illustrating a main body in the vacuum low-temperature cooker of FIG. 1.

FIG. 4 is an exploded perspective view illustrating a vacuum packaging unit in the vacuum low-temperature cooker of FIG. 1.

FIG. 5 is a bottom view illustrating an interior of a base portion in the vacuum packaging unit of FIG. 4.

FIG. 6 is an exploded perspective view illustrating a connection cable in the vacuum low-temperature cooker of FIG. 1.

FIGS. 7 and 8 are a side view and a plan view illustrating the connection cable of FIG. 6.

FIG. 9 is a cross-sectional view taken along line I-I' of FIG. 7.

FIG. 10 is a cross-sectional view taken along line II-II' of FIG. 8.

FIGS. 11 through 13 are views illustrating an exemplary embodiment of a detachable structure and an integrated structure of a stand and a vacuum packaging unit in a vacuum low-temperature cooker of the present disclosure.

FIG. 14 is a view illustrating a heating unit, a vacuum pump, and a control unit mounted in a single housing, as another exemplary embodiment of a vacuum low-temperature cooker of the present disclosure.

BEST MODE FOR INVENTION

FIG. 1 is a perspective view illustrating a vacuum low-temperature cooker according to an exemplary embodiment, FIG. 2 is a perspective view illustrating a main body fixed to an accommodation tub in the vacuum low-temperature cooker of FIG. 1, FIG. 3 is a front view illustrating a main body in the vacuum low-temperature cooker of FIG. 1, and FIG. 4 is an exploded perspective view illustrating a vacuum packaging unit in the vacuum low-temperature cooker of FIG. 1.

Referring to the drawings, a vacuum low-temperature cooker of the present disclosure may include a main body 100, a vacuum packaging unit 200, and a control unit 300.

Here, the main body 100 is provided with a heating unit 110 immersed in fluid 1 accommodated in an accommodation tub 10 and heating the fluid 1. In addition, the vacuum packaging unit 200 is a unit having a structure connected to the main body 100 and vacuum-sealing a packaging film. Moreover, the control unit 300 is a unit controlling the heating unit 110 and the vacuum packaging unit 200.

In the vacuum low-temperature cooker of the present disclosure, the control unit 300 may be installed in the main body 100 or in the vacuum packaging unit 200.

In other words, the control unit 300 may be installed in the main body 100 as illustrated in the drawings, or may be installed in the vacuum packaging unit 200, although not illustrated in the drawings. The control unit may be installed in one of the main body 100 or the vacuum packaging unit 200 as long as the control unit serves to control all of the heating unit 110 and the vacuum packaging unit 200 as a single configuration.

As a result, the vacuum low-temperature cooker of the present disclosure has a structure in which the main body 100 having the heating unit 110, and the vacuum packaging unit 200 are combined in one. In detail, all of the main body 100 having the heating unit 110, heating fluid 1 for low-temperature cooking, and the vacuum packaging unit 200, vacuum packaging food, are configured to be controlled by a single control unit 300, so vacuum low temperature cooking may be smoothly and conveniently performed, and manufacturing costs may be reduced and product costs may be lowered.

Meanwhile, in the vacuum low-temperature cooker of the present disclosure, a vacuum pump VP providing air suction power to the vacuum packaging unit 200 may be installed in the main body 100 or the vacuum packaging unit 200.

In other words, the vacuum pump VP may be embedded in the vacuum packaging unit 200, a portion vacuum-sealing a packaging film, although not illustrated in the drawings, or may be installed in the main body 100 connected to the vacuum packaging unit 200 as illustrated in FIG. 1. The vacuum pump may be installed in one of the main body 100 or the vacuum packaging unit 200 as long as the vacuum pump provides air suction power so as to suck air from a packaging film when the packaging film is vacuum-packaged in the vacuum packaging unit 200.

In this case, when the vacuum pump VP is not installed in the vacuum packaging unit 200 but is installed in the main body 100, the main body 100 and the vacuum packaging unit 200 are connected by a connection cable 400 so as to be in air and electrical communication with each other.

Furthermore, the main body 100 may include a pressure sensor (not shown), electrically connected to the vacuum pump VP and the control unit 300, and measuring negative pressure of the vacuum pump VP so as to allow the control unit 300 to control an operation of the vacuum pump VP. When an interior of a packaging film is vacuumed after the vacuum pump VP is operated and a predetermined time has elapsed, and negative pressure of the vacuum pump VP, measured by the pressure sensor, is greater than a value, set in the control unit 300, an operation of the vacuum pump VP may be stopped by the control unit 300.

For reference, in the main body 100, a discharge tube (not shown), connected to an air discharge port of the vacuum pump VP having been embedded, is connected to a lower end, thereby discharging air from the vacuum pump VP externally and discharging moisture, coming when air is sucked, externally.

FIG. 5 is a bottom view illustrating an interior of a base portion in the vacuum packaging unit of FIG. 4, and FIG. 6 is an exploded perspective view illustrating a connection cable in the vacuum low-temperature cooker of FIG. 1.

In addition, FIGS. 7 and 8 are a side view and a plan view illustrating the connection cable of FIG. 6, FIG. 9 is a cross-sectional view taken along line I-I' of FIG. 7, and FIG. 10 is a cross-sectional view taken along line II-II' of FIG. 8.

When all of the control unit 300 and the vacuum pump VP are installed in the main body 100, as illustrated in FIG. 1, the main body 100 and the vacuum packaging unit 200 are connected by a connection cable 400.

Here, the connection cable 400 has a structure connecting an external vacuum pump VP, providing air suction power, to a chamber portion 220 of the vacuum packaging unit 200 to be in air communication with each other, and connecting an external control unit 300, controlling while providing power, to a sealing unit 230 of the vacuum packaging unit 200 to be in electrical communication with each other.

In detail, the connection cable 400 may have an air line, allowing the vacuum pump VP to be in communication with the chamber portion 220, and an electric line, electrically connecting the control unit 300 to the sealing unit 230.

In this case, as illustrated in the drawings, the vacuum pump VP and the control unit 300, disposed externally, may be embedded in the main body 100 of the vacuum low-temperature cooker by way of example. For reference, the control unit 300 serves to control while providing power to the sealing unit 230 of the vacuum packaging unit 200, when the vacuum low-temperature cooker is connected to a power source by a power line 130.

In addition, at least a portion of the electric line may be disposed in an air passage in the air line.

As described above, the electric line is disposed in the air line, so the electric line may not be exposed externally to be protected. Furthermore, the connection cable 400 may have a simple link structure rather than a complex link structure.

In detail, the air line may include an air plug 410 connected to an air end of the vacuum pump VP, an air connector 420 connected to the chamber portion 220 of the vacuum packaging unit 200, and an air hose 430 connecting the air plug 410 to the air connector 420.

Here, the air plug 410 may have a plug structure to be connected to an air end 140 of the main body 100 in communication with the vacuum pump VP disposed in the main body 100 of the vacuum low-temperature cooker.

The air plug 410 may include a plug housing 411 into which the air hose 430 is inserted, an inner tube 412 disposed in the plug housing 411, and a housing cover 413 mounted on an opening **411*b* of the plug housing 411**.

In this case, in the plug housing 411, the air hose 430 is inserted into an interior through a connection hole **411*a* of one end, and the opening 411*b*** may be formed in the other end.

In addition, the inner tube 412 is disposed in the plug housing 411, one end thereof is connected to the air hose 430, and a first half-hole **412*a*** may be formed in a side portion of the other end thereof.

Moreover, the housing cover 413 may be mounted on the opening **411*b* to cover the opening 411*b* of the plug housing 411**.

In addition, the electric line may include an electric plug pin 480 mounted on the air plug 410, and an electric wire 490 connected to the electric plug pin 480.

Here, the electric plug pin 480 may be formed to be connected to the electricity end of the control unit 300, that is, the electricity end formed to be electrically connected to the control unit 300 in the main body 100.

In addition, the electric wire 490 is passing through and disposed in the air connector 420 and the air hose 430, one end thereof is connected to the sealing unit 230 of the vacuum packaging unit 200, and the other end thereof may be connected to the electric plug pin 480. For reference, the electric wire may be electrically connected to a hot wire 231 of the sealing unit 230.

In detail, the electric plug pin 480 is mounted to pass through the housing cover 413, one end thereof is disposed inwardly of the plug housing 411, and the other end thereof is disposed outwardly of the plug housing 411.

Moreover, the housing cover 413 of the air plug 410 may include an air tube 414 passing through and extended outwardly of the plug housing 411 while being connected to the inner tube 412. An O-ring 414*b* may be configured to surround an outer circumferential surface of the air tube 414.

In this case, as the other end of the inner tube 412 is inserted into and connected to an end of the air tube 414 inwardly of the plug housing 411, a second half-hole 414*a* is combined with the first half-hole 412*a* and is forming an outlet of the electric wire 490, so the electric wire 490 is coming out of the outlet while bent in a lateral direction to be connected to one end of the electric plug pin 480.

In this case, as illustrated in FIG. 1, when the vacuum pump VP and the control unit 300, respectively externally disposed, are embedded in the main body 100 of the vacuum low-temperature cooker, the air end and the electricity end may be configured in a socket S formed in an outer housing 120 of the main body 100 of the vacuum low-temperature cooker by way of example.

In detail, an air end of the vacuum pump VP, that is, an end, which is connected to the vacuum pump VP in the main body 100 and into which air is sucked, is a through tube P of the socket S, and an electricity end of the control unit 300, that is, an end, which is connected to the control unit 300 in the main body 100 and to which power is provided, is a terminal T of the socket S. For reference, the terminal T is electrically connected to a control processing unit 330 in the control unit 300.

Meanwhile, the air connector 420 is mounted in a base member 210 of the vacuum packaging unit 200.

The air connector 420 may include a first branch tube 421 to which the air hose 430 is connected, a second branch tube 422 connected to the chamber portion 220 by a link tube 429, a third branch tube 423 provided with the electric wire 490 disposed therein and passing therethrough, and a hub tube 424 connecting the first branch tube 421, the second branch tube 422, and the third branch tube 423. For reference, air, sucked through an air suction hole 220*a* of the chamber portion 220, moves through the link tube 429 to an air hose 430.

Here, the electric wire 490 passes through the hub tube 424 and the third branch tube 423 from the air hose 430 to be extended and disposed.

Moreover, a stopper 425 may be mounted on an end of the third branch tube 423, and the stopper 425 may be provided with a line hole 425*a* with the electric wire 490 disposed therein and passing therethrough not to allow air to pass therethrough and to only allow the electric wire 490 to pass therethrough. In this case, the line hole 425*a* provided with the electric wire 490 disposed therein and passing therethrough is processed to be sealed not to allow air to come in and out.

Moreover, although not illustrated in the drawings, the electric line may have a structure in which at least a portion thereof is attached to an external surface of an air line or is disposed in an outer cover of the air line, and furthermore may have a structure arrangement arranged such that the electric line is arranged separately from the air line.

Meanwhile, the heating unit 110, the vacuum packaging unit 200, and the control unit 300 will now be described in detail with reference to FIGS. 1 to 4.

First, the heating unit 110 may include an inner housing 111, a heater 112, a stirring member 113, and a sensor 114.

Here, the inner housing 111 is a portion immersed in fluid 1 of the accommodation tub 10, and a through hole 111*a* may be formed therein to allow fluid 1 to pass therethrough. Moreover, a level limit line 111*b*, indicating appropriate upper and lower limits for cooking, with respect to a level of the fluid 1 accommodated in the accommodation tub 10, may be formed in an external surface of the inner housing 111.

In addition, the heater 112 is embedded in the inner housing 111 and heats fluid 1, and a heating bar, disposed in a vertical direction as illustrated in the drawings, may be used by way of example. The heating bar is in contact with the fluid 1 and is then heat-exchanged, thereby heating the fluid 1.

Moreover, the stirring member 113 is embedded in the inner housing 111 and allows fluid 1 to flow so as to allow the fluid 1 to pass through the inner housing 111 through a through hole, and a rotating fan, rotated by a motor as illustrated in the drawings, may be used by way of example.

In addition, the sensor 114 is mounted on the inner housing 111 and measures a temperature of fluid 1, and a thermocouple may be used by way of example.

In this case, the heater 112, the stirring member 113, and the sensor 114, described previously, are electrically connected to the control unit 300, so power is provided and driving is controlled. Moreover, while a real time temperature of the fluid 1 is measured, the fluid may be heated to a set temperature and may be maintained.

Moreover, the vacuum packaging unit 200 may include a base member 210 connected to the main body 100, as well as a chamber portion 220, a sealing unit 230, and a cover member 240, mounted on the base member 210.

Here, the chamber portion 220 is provided with an air suction hole 220*a* sucking air from a packaging film. Thus, when the packaging film is seated thereon, air in the packaging film is sucked through an opening of the packaging film to be vacuumed.

In addition, the sealing unit 230 is a unit heat-sealing the packaging film, and a hot wire 231 heating and pressing a portion of the packaging film, in which an opening is formed, is mounted thereon.

Moreover, the cover member 240 is configured to cover the chamber portion 220 and the sealing unit 230 with the packaging film interposed between the cover member, and the chamber portion and the sealing unit, and may serve to press the packaging film while covering the packaging film from the top, when the portion of the packaging film, in which the opening is formed, is seated on the base member 210 to be disposed over the chamber portion 220 and the sealing unit 230.

Meanwhile, the control unit 300 may include an input unit 310, a display unit 320, and a control processing unit 330.

Here, the input unit 310 is a unit into which a control command is input to control the heating unit 110 and the vacuum packaging unit 200, the display unit 320 is a unit displaying an input display of the input unit 310 and a state display of the heating unit 110 and the vacuum packaging unit 200, and the control processing unit 330, a unit processing the control command input through the input unit 310, may be a printed circuit board (PCB) or a microprocessor. For reference, reference numeral 130 in FIG. 1 may be a power line, to which power of the vacuum low-temperature cooker of the present disclosure is provided.

In the vacuum low-temperature cooker of the present disclosure, a specific shape of the main body 100 will be described below.

The main body 100 may include an inner housing 111 and an outer housing 120. Here, the inner housing 111 is provided with the heating unit 110 mounted thereon, and is disposed inwardly of the accommodation tub 10 in a plan view. Moreover, the outer housing 120 is connected to the inner housing 111, and is disposed outwardly of the accommodation tub 10 in a plan view. In this case, the outer housing 120 may be provided with the vacuum pump VP and the control unit 300, mounted thereon.

Thus, a side wall 11 of the accommodation tub 10 is disposed between the heating unit 110 and the outer housing, so direct thermal influence of the heating unit 110 on the control unit 300 and the vacuum pump VP may be significantly reduced and direct thermal influence from fluid 1 heated by the heating unit 110 may be significantly reduced. Thus, the control unit 300 and the vacuum pump VP may be prevented from malfunctioning or being damaged due to heat.

In detail, the inner housing 111 and the outer housing 120 are disposed to be parallel in a vertical direction, and are disposed to be connected to each other in a "∩" shape in which a stop groove 100*a* is disposed in a lower portion, so the side wall 11 of the accommodation tub 10 is inserted into the stop groove 100*a* to allow the main body 100 to be caught in the accommodation tub 10. Thus, the main body 100 may have a structure stably caught in the accommodation tub 10. Moreover, an exhaust port 190 exhausting heat of an interior may be formed in an upper joint.

In addition, in the outer housing 120, a clamp 121 pressing the side wall 11 of the accommodation tub 10 is mounted thereon, so a position of the main body 100 may be fixed to the accommodation tub 10.

Furthermore, as another exemplary embodiment, as illustrated in FIG. 14, the main body 100 may include a single housing H disposed inwardly of the accommodation tub 10 in a plan view, and a heating unit 110, a vacuum pump VP, as well as a control unit 300 may be mounted in the housing H.

Here, components, designated by reference numerals having not been described, have already been described above and therefore will not be described.

FIGS. 11 through 13 are drawings illustrating an exemplary embodiment with respect to a detachable structure and an integrated structure of a stand and a vacuum packaging unit in a vacuum low-temperature cooker of the present disclosure.

Referring to the drawings, the vacuum low-temperature cooker of the present disclosure may further include a stand 510 on which the main body 100, described previously, is mounted.

In addition, the stand 510 or the vacuum packaging unit 200 may be provided with a support bracket portion 520 configured to allow the stand and the vacuum packaging unit to be removably attachable to each other.

In other words, as illustrated in FIG. 11, the support bracket portion 520 is formed in the stand 510, so the vacuum packaging unit 200 is able to be assembled in the support bracket portion 520 to be removably attached to the stand 510. Moreover, as another example, as illustrated in FIG. 12, the support bracket portion 520 is formed in the vacuum packaging unit 200, so the stand 510 is able to be assembled in the support bracket portion 520 to be removably attached to vacuum packaging unit 200.

In addition, as another example, as illustrated in FIG. 13, the stand 510 may be integrally configured with the vacuum packaging unit 200.

Furthermore, as another example, although not illustrated in the drawings, the stand 510 or the support bracket portion 520 is provided with a connection cable embedded therein. The main body 100 and the vacuum packaging unit 200 are in air and electrical communication with each other by a connection cable, when being fastened to a terminal of a connection cable of the stand 510 or the support bracket portion 520, having been exposed. In other words, a connection cable is configured in the stand 510 or the support bracket portion 520 while not being exposed externally, and only a terminal is configured to be exposed to an external surface of the stand 510 or the support bracket portion 520. Thus, the main body 100 and the vacuum packaging unit 200 are in air and electrical communication with each other, when being fastened to a terminal of a connection cable in the stand 510 or the support bracket portion 520.

As a result, as described previously, the vacuum low-temperature cooker of the present disclosure has a structure in which the main body 100, having the heating unit 110, and the vacuum packaging unit 200 are combined in one. In further detail, all of the main body 100, having the heating unit 110 heating fluid 1 for low-temperature cooking, and the vacuum packaging unit 200, vacuum packaging food, are configured to be controlled by a single control unit 300. Thus, vacuum low temperature cooking may be smoothly and conveniently performed, and manufacturing costs may be reduced and product costs may be lowered.

While the present disclosure has been particularly shown and described with reference to exemplary embodiments thereof, the present disclosure not limited thereto. It will be apparent to those skilled in the art that various changes and modifications thereof could be made within the spirit and scope of the present disclosure, and therefore it is to be understood that such changes and modifications belong to the scope of the appended claims.

The invention claimed is:

1. A vacuum low-temperature cooker, comprising:

a main body having a heating unit immersed in fluid accommodated in an accommodation tub and heating the fluid;

a vacuum packaging unit connected to the main body and vacuum-sealing a packaging film; and a control unit installed in the main body or the vacuum packaging unit, and electrically connected to the heating unit and the vacuum packaging unit so as to control the heating unit and the vacuum packaging unit, wherein a vacuum pump, providing air suction power to the vacuum packaging unit, and the control unit are installed in the main body, and the vacuum packaging unit and the main body are connected by a connection cable so as to be in air and electrical communication with each other, wherein the connection cable includes:

an air line, connecting a chamber portion of the vacuum packaging unit, in which air is sucked, to the vacuum pump, to allow air to flow; and an electric line electrically connecting a sealing unit of the vacuum packaging unit, heated, to the control unit, wherein the electric line is provided with at least a portion disposed in the air line.

2. The vacuum low-temperature cooker of claim 1, wherein the air line includes:

an air plug formed to be connected to an air end of the vacuum pump;

an air connector connected to the chamber portion of the vacuum packaging unit; and an air hose connecting the air plug to the air connector, and the electric line includes:

an electric plug pin mounted on the air plug, and formed to be connected to an electricity end of the control unit; and an electric wire, passing through while being disposed in the air connector and the air hose, one end of which is connected to the sealing unit of the vacuum packaging unit and the other end is connected to the electric plug pin.

3. The vacuum low-temperature cooker of claim 2, wherein the air plug includes:

a plug housing in which the air hose is inserted into an interior through a connection hole of one end, and an opening is formed in the other end;

an inner tube, disposed in the plug housing, one end of which is connected to the air hose and a side portion of the other end is provided with a first half-hole formed therein; and a housing cover mounted on the opening to cover the opening of the plug housing, the electric plug pin is mounted to pass through the housing cover to allow one end to be disposed inwardly of the plug housing and to allow the other end to be disposed outwardly of the plug housing, the housing cover has an air tube passing through and extended outwardly of the plug housing while being connected to the inner tube, and the air tube is provided with a second half-hole combined with the first half-hole and forming an outlet of the electric wire as the other end of the inner tube is inserted into and connected to an end of the air tube inwardly of the plug housing, so the electric wire is connected to one end of the electric plug pin through the outlet.

4. The vacuum low-temperature cooker of claim 2, wherein the air connector includes:

a first branch tube connected to the air hose;

a second branch tube connected to the chamber portion by a link tube;

a third branch tube provided with the electric wire disposed therein and passing therethrough; and a hub tube connecting the first branch tube, the second branch tube, and the third branch tube, and the electric wire passes from the air hose through the hub tube and the third branch tube to be extended and disposed.

5. The vacuum low-temperature cooker of claim 4, wherein the third branch tube is provided with an end with a stopper having a line hole provided with only the electric wire disposed therein and passing therethrough, so as not to allow air to pass therethrough and to only allow the electric wire to pass therethrough.

6. The vacuum low-temperature cooker of claim 1, wherein the electric line is provided with at least a portion attached to an external surface of the air line, or disposed in an outer cover of the air line.

7. The vacuum low-temperature cooker of claim 1, wherein the heating unit includes:

an inner housing immersed in the fluid in the accommodation tub, and having a through hole formed therein to allow the fluid to pass therethrough;

a heater embedded in the inner housing and heating the fluid;

a stirring member embedded in the inner housing, and allowing the fluid to flow so as to allow the fluid to pass the inner housing through the through hole; and a sensor mounted on the inner housing, and measuring a temperature of the fluid.

8. The vacuum low-temperature cooker of claim 1, wherein the vacuum packaging unit includes:

a base member connected to the main body;

a chamber portion mounted on the base member, and provided with an air suction hole sucking air from the packaging film formed therein;

a sealing unit mounted on the base member, and sealing the packaging film; and a cover member mounted on the base member, and configured to cover the chamber portion and the sealing unit with the packaging film interposed between the cover member, and the chamber portion and the sealing unit.

9. The vacuum low-temperature cooker of claim 1, wherein the control unit includes:

an input unit into which a control command is input so as to control the heating unit and the vacuum packaging unit;

a display unit displaying an input display of the input unit and a state display of the heating unit and the vacuum packaging unit; and a control processing unit processing the control command input through the input unit.

10. The vacuum low-temperature cooker of claim 1, wherein the main body includes:

a pressure sensor electrically connected to the vacuum pump and the control unit, and measuring negative pressure of the vacuum pump to allow the control unit to control an operation of the vacuum pump.

11. The vacuum low-temperature cooker of claim 1, wherein the main body has an inner housing and an outer housing, the inner housing is provided with the heating unit mounted thereon and is disposed inwardly of the accommodation tub, the outer housing is connected to the inner housing and is disposed outwardly of the accommodation, and the outer housing is provided with the vacuum pump and the control unit mounted thereon.

12. The vacuum low-temperature cooker of claim 11, wherein the inner housing and the outer housing are disposed to be parallel in a vertical direction and are disposed to be connected to each other in a "∪" shape in which a stop groove is formed in a lower portion, so a side wall of the accommodation tub is inserted into the stop groove to allow the main body to be caught in the accommodation tub.

13. The vacuum low-temperature cooker of claim 12, wherein the outer housing is provided with a clamp, pressing the side wall of the accommodation tub, so as to allow a position of the main body to be fixed to the accommodation tub.

14. The vacuum low-temperature cooker of claim 1, wherein the heating unit, the vacuum pump, and the control unit are mounted on a single housing disposed inwardly of the accommodation tub.

15. The vacuum low-temperature cooker of claim 1, further comprising:

a stand on which the main body is mounted.

16. The vacuum low-temperature cooker of claim 15, wherein the stand or the vacuum packaging unit is provided with a support bracket portion configured to allow the stand and the vacuum packaging unit to be removably attachable to each other.

17. The vacuum low-temperature cooker of claim 15, wherein the stand or the support bracket portion is provided with the connection cable embedded therein, and the main body and the vacuum packaging unit are in air and electrical communication with each other by the connection cable, when fastened to a terminal of the connection cable, exposed in the stand or the support bracket portion.

* * * * *